United States Patent [19]

Inata et al.

[11] Patent Number: 5,216,261
[45] Date of Patent: Jun. 1, 1993

[54] NON-LINEAR OPTICAL DEVICE HAVING AN IMPROVED RATE FOR RECOVERY

[75] Inventors: Tsuguo Inata; Shunichi Muto, both of Kawasaki, Japan

[73] Assignee: Fujitsu Limited, Kawasaki, Japan

[21] Appl. No.: 810,090

[22] Filed: Dec. 19, 1991

[30] Foreign Application Priority Data

Dec. 20, 1990 [JP] Japan .................................. 2-411915
Mar. 20, 1991 [JP] Japan .................................. 3-080406
Oct. 22, 1991 [JP] Japan .................................. 3-273764

[51] Int. Cl.$^5$ ............................................. H01L 27/14
[52] U.S. Cl. .......................................... 257/15; 257/21; 257/17; 257/22; 257/25; 257/185; 359/248
[58] Field of Search ..................... 357/30 E, 30 R, 16, 357/4, 19, 55; 359/263, 248, 245; 257/15, 17, 21, 22, 25, 185

[56] References Cited

U.S. PATENT DOCUMENTS 4,720,309  1/1988  Deveaud et al. ................. 357/16 X

FOREIGN PATENT DOCUMENTS 0358229  3/1990  European Pat. Off. .
2-210332 8/1990  Japan .

Primary Examiner—William Mintel
Attorney, Agent, or Firm—Staas & Halsey

[57]   ABSTRACT

A non-linear optical device having the TBQ structure comprises an active layer forming a quantum well for interacting with an incident optical beam, an electron removal layer provided adjacent to the active layer at a first side thereof with a first barrier layer intervening therebetween for removing the electrons from the active layer; and a hole removal layer provided adjacent to the active layer at a second, opposite side of the active layer with a second barrier layer intervening therebetween for removing the holes from the active layer; wherein the first and second barrier layers have respective thicknesses determined such that the probability of tunneling of the electrons through the first barrier layer and the probability of tunneling of the holes through the second barrier layer are substantially equal with each other.

14 Claims, 11 Drawing Sheets

NON-LINEAR OPTICAL DEVICE HAVING AN IMPROVED RATE FOR RECOVERY

CROSS REFERENCE TO RELATED APPLICATIONS

This application is related to copending U.S. patent appliation Ser. No. 07/758,857, which is a continuation-in-part of U.S. patent application Ser. No. 07/742,589, now abandoned, which is a continuation of U.S. patent application Ser. No. 07/404,958, now abandoned.

BACKGROUND OF THE INVENTION

The present invention generally relates to semiconductor devices and more particularly to a non-linear optical device that has an improved rate for recovery after causing transition.

The U.S. patent application Ser. No. 07/404,958, now abandoned, and corresponding European patent application No.89 116 667.0 describe a non-linear optical device that changes its transparency upon incidence of an optical beam. In such a device, a two-dimensional quantum well is formed for creating excitons that absorb the incident optical beam. Upon incidence of the optical beam, the excitons decompose into electrons and holes. Electrons and holes may be excited simultaneously. Thereby the refractive index of the device changes. Such a change is also accompanied with the change of transparency of the device.

In such a non-linear optical device, one can control the optical transmittance by injecting a control optical beam that interacts with the excitons in the two-dimensional quantum well. In response to the irradiation of a strong control optical beam, the quantum well is saturated by the electrons and holes that are created by the optical absorption or decomposition of the excitons, and the device loses its ability of optical absorption. In other words, the device changes from an opaque state to a transparent state. On the other hand, the recovery to the original opaque state after the interruption of the control optical beam generally needs much longer time because of the time needed for the electrons and holes accumulated in the quantum well to dissipate.

In order to achieve the quick recovery of the original state upon the interruption of the incident optical beam, the non-linear optical device disclosed in the above references uses the so-called TBQ (tunneling bi-quantum well) structure that facilitates the quick escape of the electrons from the quantum well of the device.

FIG. 1 shows the band structure of the TBQ device. Referring to FIG. 1, the TBQ structure includes an active layer 34 confined two-dimensionally by a pair of barrier layers 33 and 35 that have a large band gap, wherein the barrier layer 35 is located above the active layer 34 while the barrier layer 33 is located below the active layer 34. Thereby, there are formed a quantum level E1 for the electrons and a quantum level H1 for the holes in the active layer 34. The excitons have a level close to but slightly lower than the quantum level E1 because of the Coulomb interaction acting between the electron and the hole that form the exciton. The barrier layers 33 and 35 are formed from a material having a large band gap as already described and forms the potential barrier that in turn defines the two-dimensional quantum well.

Above the barrier layer 35, there is provided a layer 36 that forms anther two-dimensional quantum well. Similarly, below the barrier layer 33, there is provided a layer 32 that forms still another two-dimensional quantum well. It should be noted that the layer 36 is bounded by the barrier layer 35 and another barrier layer 37 that has a large band gap similar to the barrier layer 35. Similarly, the layer 32 is bounded by the barrier layer 33 and another barrier layer 31 that has a large band gap similar to the barrier layer 33.

Here, the width of the layer 32 or 36 is set substantially larger than the layer 34 such that there is formed a quantum level $E1'$ of electrons at a level substantially lower than the quantum level E1. Associated therewith, a quantum level $H1'$ of holes is formed at a level substantially lower than the quantum level H1 in terms of the energy of the holes. Similarly, the width of the layer 32 is set substantially larger than the layer 34 such that there are formed a quantum level of electrons that is identical with the quantum level $E1'$ and a quantum level of holes that is identical with the quantum level $H1'$.

In the foregoing TBQ structure, the thickness of the barrier layers 33 and 35 is set substantially small such that the electrons at the quantum level E1 of the quantum well layer 34 can escape freely to the quantum level $E1'$ of the quantum well layer 36 by tunneling through the barrier layers 33 and 35. More specifically, when the electrons are excited in the layer 34 from the quantum level H1 to the quantum level E1 in response to the absorption of the incident optical beam or the control optical beam, the electrons immediately escape to the layers 32 and 36 by tunneling through the barrier layers 33 and 35. Thereby, the problem of unwanted residence of the electrons in the layer 34 after the incident optical beam is interrupted is eliminated, and the recovery time of the non-linear optical device can be significantly improved.

In such a conventional TBQ device, however, there exists a problem in that not only the quantum well layer 34 but also the quantum well layers 32 and 36 cause the optical absorption. It should be noted that the energy needed for causing the transition of electrons from the quantum level $H1'$ to the quantum level $E1'$ is much smaller than the energy needed for causing the transition of the electrons from the quantum level H1 to the quantum level E1. In other words, the incidence of an optical beam that has an energy sufficient to cause the transition of electrons in the quantum well layer 34 inevitably causes the transition of electrons in the quantum well layers 32 and 36, and the transition of the electrons in the quantum well layers 32 and 36 causes an unwanted absorption of the optical beam. In other words, the conventional device of FIG. 1 has suffered from the problem of low S/N ratio.

The device of FIG. 1 has another problem of the residence of the holes in the quantum well layer 34 after the interruption of the control optical beam. It should be noted that the holes have an effective mass that is much larger than the effective mass of the electrons. Thereby, the probability of tunneling of the holes through the barrier layers 33 and 35 becomes much smaller than the probability of tunneling of the electrons, and there is a tendency that the expected quick recovery of the optical property is not obtained due to the residence of the holes in the layer 34 even after the interruption of the optical beam.

Such an unwanted residence of the holes in the layer 34 causes another problem of the shift in the energy level of the layer 34 with respect to the energy level of the other layers. More specifically, the energy level of the layer 34 tends to be lowered in the band diagram with respect to the layers 32 and 36 when there are holes accumulated in the layer 34. Ultimately, there may be a case wherein the energy level E1 of the layer 34 may become equal to or close to the energy level E1' of the layers 32 and 36. When this occurs, no efficient removal of the electrons from the layer 34 to the layers 32 and 36 through the barrier layers 33 and 35 is expected.

In the structure of FIG. 1, the unwanted residence of the holes in the active layer 34 may be prevented by reducing the thickness of the barrier layers 33 and 34 such that the tunneling probability of the holes increases. When such an approach is adopted, however, there arises a problem of excessive escaping of the electrons from the layer 34 to the layers 32 and 36 because of the smaller effective mass of electrons. Thereby, the formation of excitons in the active layer 34 may not be obtained due to the depletion of the electrons in the layer 34. In the structure of FIG. 1, it should be noted that both the electrons and holes exit from the active layer 34 through the barrier layers 33 and 35.

SUMMARY OF THE INVENTION

Accordingly, it is a general object of the present invention to provide a novel and useful non-linear optical device, wherein the foregoing problems are eliminated.

Another and more specific object of the present invention is to provide a non-linear optical device operated between an original state and an activated state, wherein the time needed for the device to recover the original state after causing a transition to the activated state is substantially reduced.

Another object of the present invention is to provide a non-linear optical device having the TBQ structure, wherein the problem of accumulation of holes in an active layer of the TBQ is minimized.

Another object of the present invention is to provide a non-linear optical device having the TBQ structure, wherein the problem of absorption of the optical beam by the layer that is other than the active layer of the TBQ is eliminated.

Another object of the present invention is to provide a non-linear optical device having the TBQ structure, said TBQ structure comprising an active layer forming a quantum well for interacting with an incident optical beam; an electron removal layer provided adjacent to the active layer at a first side thereof with a first barrier layer intervening therebetween for removing the electrons from the active layer; and a hole removal layer provided adjacent to the active layer at a second, opposite side of the active layer with a second barrier layer intervening therebetween for removing the holes from the active layer; wherein the first and second barrier layers have respective thicknesses determined such that the probability of tunneling of the electrons through the first barrier layer and the probability of tunneling of the holes through the second barrier layer are substantially equal with each other. According to the present invention, the electrons and holes are removed from the active layer via respective paths and it becomes possible to control such that the electrons and holes are removed effectively while guaranteeing the stable formation of excitons in the active layer. Thereby, the device shows a quick response without sacrificing the clear optical non-linearity.

In a preferred embodiment, the electron removal layer and the hole removal layer form the type-II heterojunction with respect to the active layer such that the conduction band of the electron removal layer is located energetically lower than the conduction band of the active layer and such that the valence band of the hole removal layer is located energetically lower than the valence band of the active layer. Further, the thickness of the electron removal layer and the thickness of the hole removal layer are set such that the energy needed for an electron in the electron removal layer or the hole removal layer to cause a transition to the excited state is substantially larger than the energy needed for an electron to cause the transition in the active layer. By setting the composition and thickness as such, one can eliminate the optical absorption of the optical beam caused by the electron removal layer or the hole removal layer.

In a further preferred embodiment, the electron removal layer and the hole removal layer are provided with means for annihilating the electrons and holes that are transferred from the active layer.

Other objects and further features of the present invention will become apparent from the following detailed description when read in conjunction with the attached drawings.

DETAILED DESCRIPTION OF THE PREFERRED EMBODIMENTS

Figure 2:
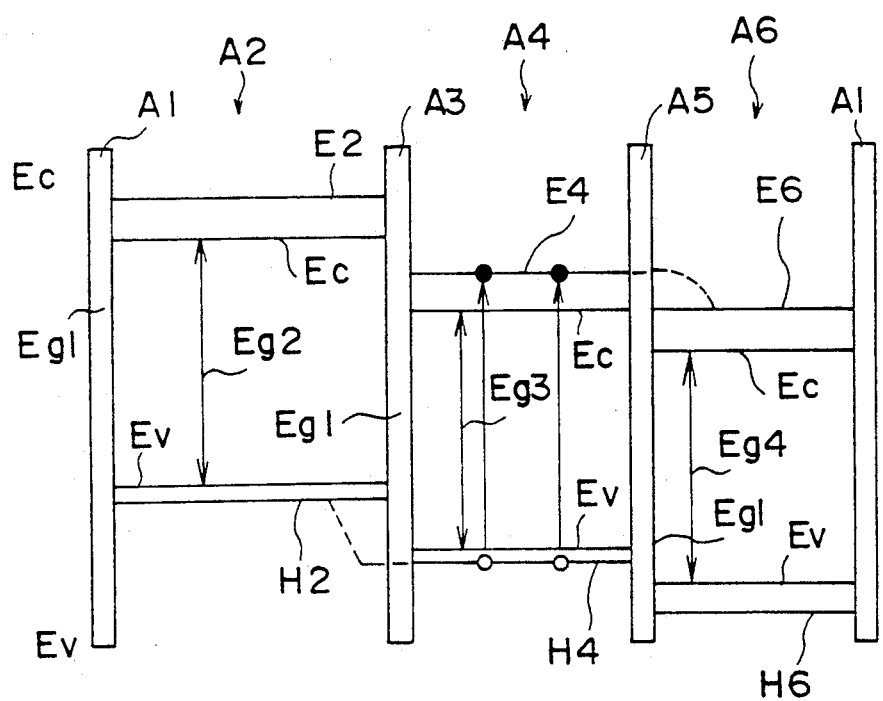
FIG. 2 is a diagram showing the band structure of the non-linear optical device according to a first embodiment of the present invention.

FIG. 2 shows the band diagram of the non-linear optical device according to a first embodiment of the present invention.

Referring to FIG. 2, the device of the present invention includes undoped semiconductor layers A1–A6, wherein the layer A1 is a barrier layer having a large band gap Eg1. In FIG. 2, the conduction band is represented as Ec and the valence band is represented as Ev. On the barrier layer A1, there is provided the layer A6 that has a band gap Eg4 substantially smaller than the band gap Eg1 of the layer A1.

On the layer A6, the barrier layer A5 identical in composition with the layer A1 is provided, and the layer A4 is provided further on the barrier layer A3 with a band gap Eg3 that is substantially smaller than the band gap Eg1. Further, the barrier layer A3, identical in composition with the barrier layers A1 and A5, is provided on the layer A4 with the band gap Eg1, and the layer A2 is provided on the barrier layer A3 with a band gap Eg2 that is substantially smaller than the band gap Eg1. Further, the barrier layer A1 is provided on the layer A2. Thereby, the semiconductor layer A6 has a lower major surface defined by the barrier layer A1 and an upper major surface defined by the barrier layer A5, the semiconductor layer A4 has a lower major surface defined by the barrier layer A5 and an upper major surface defined by the barrier layer A3 and the semiconductor layer A2 has a lower major surface defined by the barrier layer A3 and an upper major surface defined by the barrier layer A1. Further, the layers A1–A6 are repeated in the vertical direction as will be described later with reference to FIG. 3 that shows the device structure.

Referring to FIG. 2 again, it will be noted that the semiconductor layers A2, A4 and A6 form the so-called type II or staggered heterojunction interface wherein the energy level of the conduction band of the layer A2 is located higher than that of the layer A4 and the energy level of the valence band of the layer A2 is located lower than that of the layer A4 in the band diagram when the layers A2 and A4 are contacted with each other in the thermal equilibrium state across the barrier layer A3 intervening therebetween. Similarly, the energy level of the conduction band of the layer A4 is higher than that of the layer A6, and the energy level of the valence band of the layer A4 is lower than that of the layer A6. Further, the barrier layers A3 and A5 are formed to have a thickness set sufficiently small such that the electrons can cause tunneling through the layer A5 from the layer A4 to the layer A6 and the holes cause tunneling through the layer A3 from the layer A4 to the layer A2.

As a result of the barrier layers formed at the upper and lower major surfaces with the band gap Eg1, the semiconductor layers A2, A4 and A6 form a two-dimensional quantum well structure characterized by discrete quantum levels of electrons above the conduction band and discrete quantum levels of holes below the valence band. More specifically, the semiconductor layer A2 is formed with a number of quantum levels of electrons above the conduction band Ec wherein only the ground level E2 is illustrated in FIG. 2. In correspondence to the quantum levels of electrons, the layer A2 is formed with the quantum levels of holes wherein only the level H2 for the ground state is illustrated in FIG. 2. Similarly, the semiconductor layer A4 forms a two-dimensional quantum well characterized by the quantum level E4 of electrons and the quantum level H4 of holes, the semiconductor layer A6 forms a two-dimensional quantum well characterized by the quantum level E6 of electrons and the quantum level H6 of holes.

The thickness of the layer A4 is determined such that the exciton level is formed close to the quantum level E4 and that the energy gap between the quantum level H4 of the holes and the quantum level E4 of the electrons corresponds to the energy of the incident optical beam as well as the control optical beam. The thickness of the layer A2 is determined, on the other hand, such that the quantum level E2 for the electrons is located higher than the quantum level E4 for the electrons in the layer A4 and that the quantum level H2 for the holes in the layer A2 is located lower than the quantum level H4 for the holes in the layer A4. Further, the thickness of the layer A6 is determined such that the quantum level E6 for the electrons is located lower than the quantum level E4 and the quantum level H6 for the holes is located higher than the quantum level H4.

In such a structure, the electrons are excited to the quantum level E4 in the layer A4 upon incidence of the optical beam, leaving holes in the quantum level H4. Thereby, the absorption of the incident optical beam occurs similar to the conventional device. Upon irradiation of the control beam that also has the wavelength interacting with the layer A4, the optical absorption occurring in the layer A4 can be made saturated. The irradiation of the control beam causes a very large population of excited electrons and holes in the layer A4 and prevents further excitations being occurred. Thereby, further decomposition of the excitons that releases the electrons and holes is also suppressed. In this state, no or little absorption occurs in the layer A4 and the device becomes transparent to the incident optical beam. This transition is achieved extremely fast, in the matter of a few femtoseconds.

To recover the original optical state after interruption of the control optical beam, one has to remove the electrons and holes from the quantum level E4 and the quantum level H4 of the layer A4. In the present embodiment, the barrier layer A5 has a thickness that allows the tunneling of the electrons therethrough. Thus, the electrons excited to the quantum level E4 immediately cause a tunneling to the quantum level E6 of the layer A6 through the barrier layer A5. Further, the holes that are created on the quantum level H4 cause a tunneling to the quantum level H2 through the barrier layer A3. As a result, the accumulation of electrons and holes in the layer A4 is avoided and the device recovers its original state immediately.

In the present invention, it should be noted that the electrons and holes are absorbed by the layer A6 and the layer A2 separately. Thereby, the probability of tunneling of the electrons through the barrier layer A5 and the probability of tunneling of the holes through the barrier layer A3 can be made substantially identical by choosing the thickness of the layer A2 and the layer A6 appropriately. Compare with the conventional structure of FIG. 1 wherein the electrons and holes escape through the same barrier layer. In this conventional case, it is impossible to control the tunneling probability of electrons and holes independently. On the contrary, the present invention enables the independent control of the tunneling probability by setting the thickness of the layer A3 and the layer A5 appropriately.

In order to facilitate the immediate transition of the holes to the layer A2, it is preferred to set the quantum level H2 of the layer A2 to locate at a level lower than the quantum level H4 of the layer A4 by an amount correspondence to the energy of the LO-mode phonons in the layer A2. By setting the energy difference of the valence bands as such, one can facilitate the falling of the holes to the quantum level H2 by a relaxation process that releases the LO-mode phonons. Similarly, it is preferred to set the quantum level E6 of the layer A6 to locate at an energy level lower than the quantum level E4 of the layer A4 by an amount corresponding to the energy of the LO-mode phonons in the layer A6. When GaAs is used for the layers A2 and A6, the LO-mode phonons have the energy of about 36 meV.

In the typical example of the first embodiment, the layers A1–A6 are formed from materials and thickness as summarized in the following TABLE I.

TABLE I

| LAYER | COMPOSITION | THICKNESS (nm) |
|---|---|---|
| A1 | InAlAs | 2.05 |
| A2 | $GaAs_{0.51}Sb_{0.49}$ | 1.76 |
| A3 | InAlAs | 1.17 |
| A4 | $(In_{0.53}Ga_{0.47}As)_{0.5}$-$(GaAs_{0.51}Sb_{0.49})_{0.5}$ | 7.33 |
| A5 | InAlAs | 2.05 |
| A6 | $In_{0.53}Ga_{0.47}As$ | 4.40 |

Further, the layers A1–A6 are repeated for 73 times. Thereby, the unit of repetition is represented as A1/A2/A3/A4/A5/A6.

In the structure of TABLE I, it will be noted that the thickness of the barrier layer A3 and the thickness of the barrier layer A5 are changed such that the thickness of the layer A3 for passing the holes is set much smaller than the thickness of the layer A5 that passes the electrons. Thereby, the probability of tunneling of the holes through the layer A5 becomes substantially identical with the probability of tunneling of the electrons through the layer A3. Further, by setting the thickness of the layer A4 as listed in the above table, the energy gap between the quantum level of the electrons and the quantum level of the holes in the layer A4 can be tuned to the optical wave having the wavelength of 1.373 $\mu$m. The layered structure having the composition and thickness as set forth above in TABLE I can be formed by the well known process such as MBE or MOCVD. As the process for fabrication is obvious to the person skilled in the art, the description thereof will be omitted.

Further, it should be noted that the energy gap between the quantum level E2 and the quantum level H2 of the layer A2 or the energy gap between the quantum level E6 and the quantum level H6 of the layer A6 is set substantially larger than the energy gap between the quantum level E4 and the quantum level H4 of the layer A4. Thereby, the excitation of the electrons does not occur in the layers A2 and A6 even when there is an excitation in the layer A4. Thereby, unwanted absorption of the incident optical beam or control optical beam by the layers A2 and A6 is positively eliminated.

Figure 3:
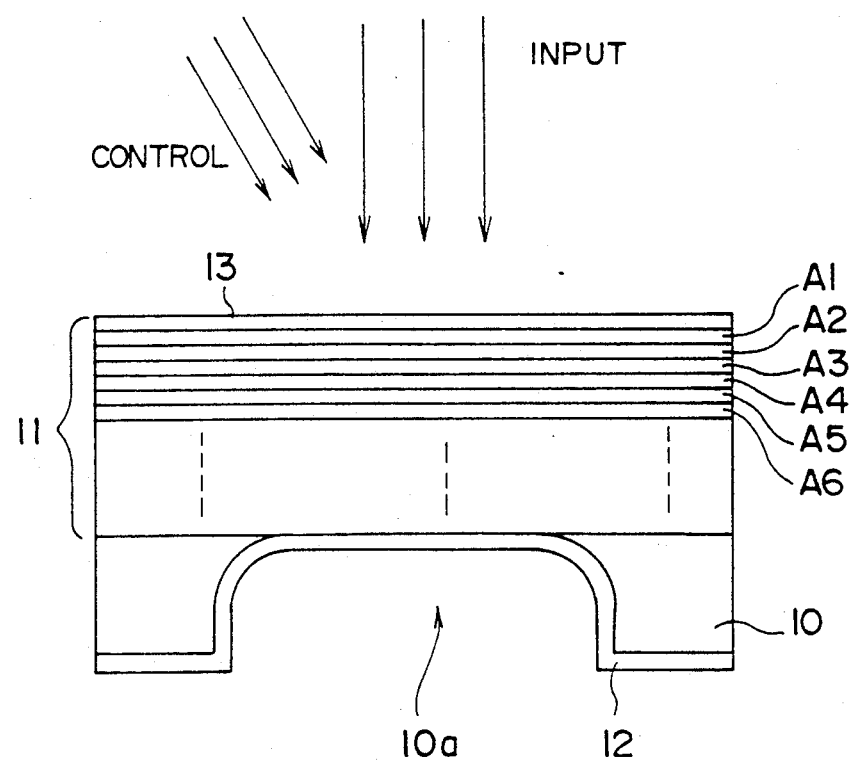
FIG. 3 is a diagram showing the structure of the non-linear optical device according to the first embodiment of the present invention.

FIG. 3 shows the structure of the non-linear optical device of the first embodiment wherein the layered structure of TABLE I is used.

Referring to FIG. 3, the device has a substrate 10 of InP having upper and lower major surfaces, wherein there is formed an opening 10a to extend from the lower major surface to the upper major surface of the substrate 10. On the upper major surface of the substrate 10, there is provided a layered body 11 that in turn comprises a repetition of the layered structure A1/A2/A3/A4/A5/A6 as described above.

In the structure of FIG. 3, the incident optical beam is irradiated substantially perpendicular to the upper major surface of the layered body 11 as illustrated in FIG. 3 by INPUT. Further, in order to control the saturation of the layered body 11, particularly of the active layer A4 in the layered body 11, a control optical beam CONTROL is irradiated obliquely as illustrated. Thereby, the transmittance of the device against the incident optical beam is controlled in response to the control optical beam such that the device becomes transparent when the control optical beam is irradiated.

In a preferred modification, one may provide a reflector 12 on the bottom surface of the layered body 11 that is exposed by the opening 10a. Similarly, a reflector 13 may be deposited on the top surface of the layered body 11. Such reflectors 12 and 13 may be a layer of gold deposited with a thickness of about 300 nm. Thereby, the reflectors 12 and 13 form the Fabry-Pérot resonator. When using the reflectors 12 and 13, it is possible to establish a resonance of the incident optical beam between the reflectors 12 and 13 in the absence of the control optical beam. In this case, the device is transparent against the incident optical beam when there is no control optical beam irradiated, while the device changes to opaque in response to the irradiation of the control optical beam. It should be noted that the irradiation of the control optical beam causes a change of refractive index of the layered body 11 and such a change of the refractive index cancels the condition of resonance. Thereby, the device becomes opaque against the incident optical beam. Alternatively, one may form the layered body 11 such that there is a deviation from the optical resonance in the absence of the control optical beam and that the resonance is achieved in response to the irradiation of the control optical beam. About the use of the Fabry-Pérot resonator in the non-linear optical device of the present invention, reference should be made to the foregoing U.S. patent application Ser. No. 07/404,958 or European patent application No. 89 116 667.0.

Figure 1:
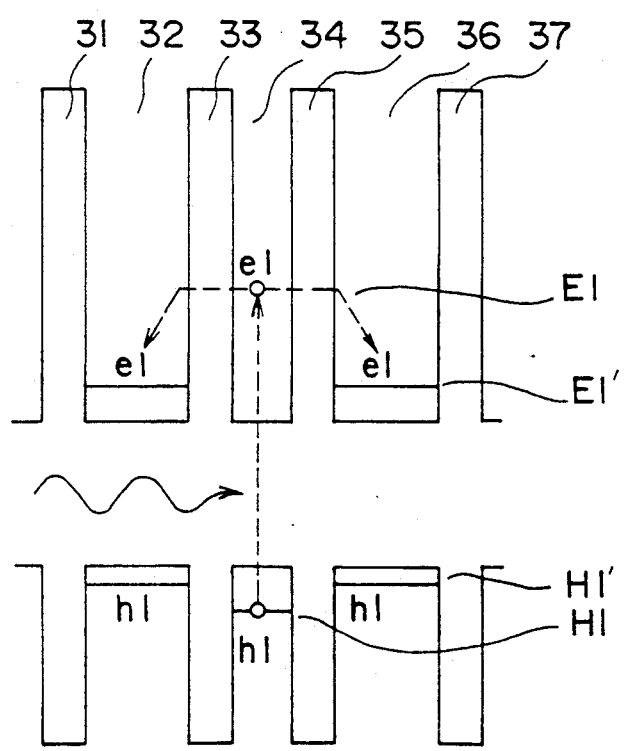
FIG. 1 is a diagram showing the band structure of a conventional non-linear optical device having the TBQ structure.
Figure 4:
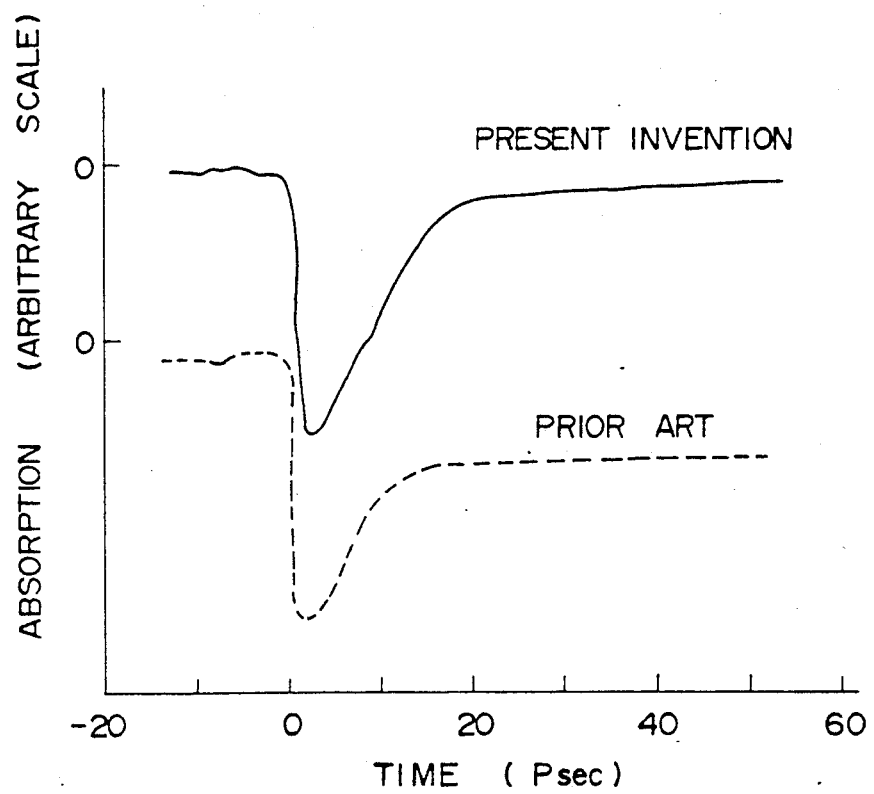
FIG. 4 is a diagram showing the response of optical absorption achieved by the first embodiment of the present invention.

FIG. 4 shows the optical response obtained for the structure of the present embodiment. The measurement was conducted by using an optical pulse having the width of 1 picosecond. As shown in FIG. 4, the original optical absorption recovers after about 20 picoseconds when the device of FIG. 3 is used. On the other hand, the original optical absorption did not recover even after 40 or 50 picoseconds when the conventional device of FIG. 1 is used. This clearly indicates the residence of the holes in the layer A4 even after the incident optical beam is interrupted. In the device of the present invention, the original absorption recovers completely due to the complete removal of the electrons and holes from the layer A4.

Figure 5A:
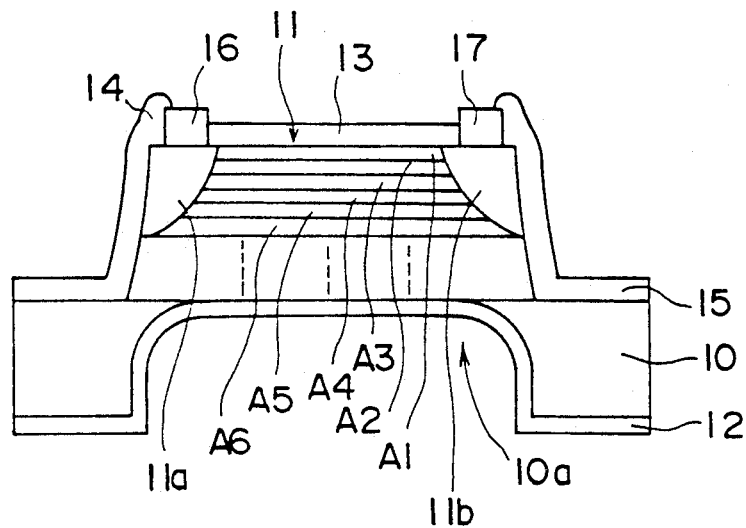
FIGS. 5(A) and 5(B) are diagrams showing the structure of the non-linear optical device according to a second embodiment of the present invention respectively in the cross sectional view and the plan view.
Figure 5B:
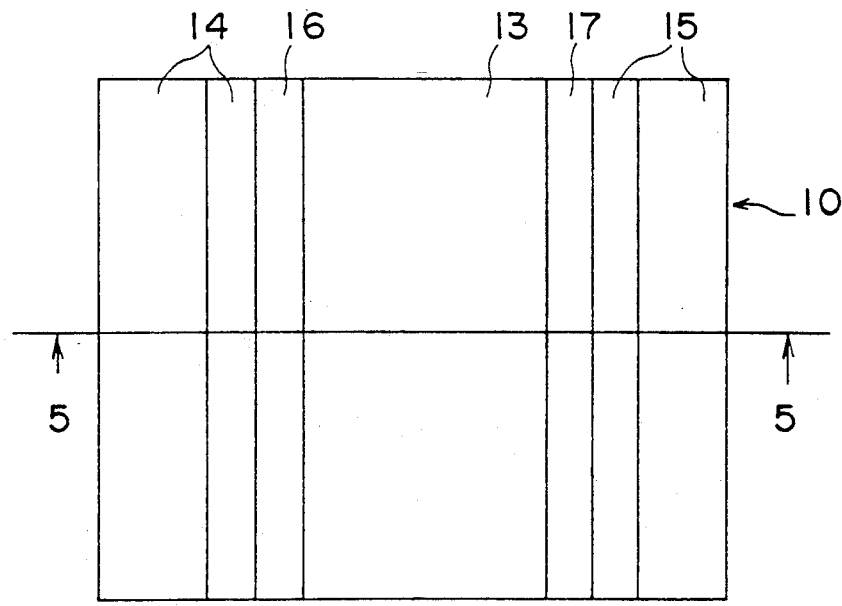

FIGS. 5(A) and 5(B) show the structure of the device according to a second embodiment of the present invention, wherein FIG. 5(A) is a cross sectional view taken along a line 5—5' of FIG. 5(B).

Referring to the cross section of FIG. 5(A), the device has a structure similar to the device of FIG. 3 and includes the layered body 11 in which the layers A1–A6 are stacked as already described.

On the layered body 11, diffusion regions 11a and 11b are formed along the opposing edges respectively by the ion implantation of beryllium and silicon such that the diffusion region 11a is doped to the p-type and the diffusion region 11b is doped to the n-type. Further, an electrode 14 is provided on the layered body 11 in contact with the side wall of the layered body 11 for ohmic contact with the diffusion region 11a while another electrode 15 is provided on the side wall of the layered body 11 in ohmic contact with the diffusion region 11b. Further, in order to achieve the insulation of the reflector 13 with respect to the electrodes 14 and 15, insulating blocks 16 and 17 are interposed such that the insulating block 16 separates the electrode 14 from the reflector 13 and the insulating block 17 separates the electrode 15 from the reflector 13. See the plan view of FIG. 5(B) wherein it can be seen that the device has a rectangular shape in the plan view and the insulating blocks 16 and 17 extend along the two opposing edges for isolating the reflector 13 from the electrodes 14 and 15.

Typically, the electrode 14 is formed by depositing a gold-zinc alloy and gold consecutively with the thickness of 100 nm and 300 nm respectively and further applying a thermal annealing at about 350° C. for alloying. The electrode 15 is formed by depositing a gold-germanium alloy and gold consecutively with the thickness of 100 nm and 300 nm respectively and further applying a thermal annealing at about 350° C.

In operation, a reverse bias voltage is applied across the electrodes 14 and 15 such that an electric field of about $10^4$ V·cm is formed in the layered body 11. In response to the electric field thus induced, the electrons, which are excited in the layer A4 and escaped to the layer A6, are transferred to the n-type diffusion region 11b and absorbed therein. It should be noted that a positive voltage is applied to the electrode 15 for the reverse biasing. Similarly, the holes that are created in the layer A4 and escaped to the layer A2 are transferred to the p-type diffusion region 11a and absorbed therein due to the negative bias voltage applied to the electrode 14. In the present invention, it is possible to remove the carriers from the layers A2 and A6 and the device shows the desired quick recovery to the original state even when a high speed optical signal is entered to the device as the incident optical beam. It should be noted that the response of the device itself is determined by the tunneling of the carriers through the barrier layers A3 and A5.

Figure 6A:
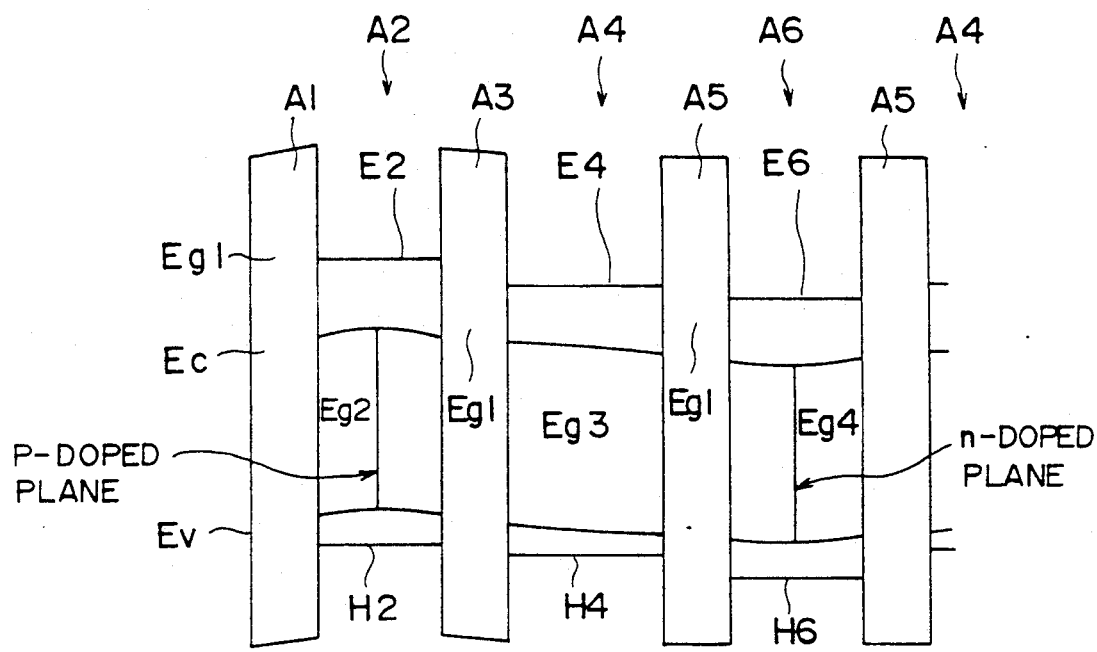
FIGS. 6(A) and 6(B) are diagrams showing the band structure and the layered construction of the non-linear optical device according to a third embodiment of the present invention.

FIG. 6(A) shows a third embodiment of the present invention wherein only the band diagram is illustrated, as the device of the present embodiment has the general device structure similar to the device of FIG. 3, except for the construction of the individual layers A1–A6 as will be explained below.

In the present embodiment, the barrier layer A1 is formed from undoped GaAlAs with the composition of $Al_{0.51}Ga_{0.49}As$ with the thickness of 1.13 nm. The layer A2 on the other hand is formed from undoped GaAs with the thickness of 3.68 nm, wherein the layer A2 is doped to the p-type by the incorporation of Be at the central part thereof with the sheet concentration of $1 \times 10^{12}$ cm$^{-2}$. In other words, there is formed a doped plane at the central part of the layer A2. The doping is achieved while the layer A2 is grown by the MBE or MOCVD process. Such a technique of planar doping is well established in the art and the description thereof will be omitted. For example, reference should be made to C. E. C. Wood, G. Metze, J. Berru and L. F. Eastman, J. Appl. Phys. 51, p.383 (1983), which is incorporated herein as reference. This layer A2 is used for removing the holes from the layer A4 as already described with reference to the first embodiment.

The layer A3 acts as the barrier layer similar to the first embodiment and is formed from undoped AlGaAs with the composition and thickness identical with the layer A1. Thereby, the layer A3 allows the holes to cause tunneling therethrough. On the other hand, the layer A4, which is the essential layer of the non-linear optical operation of the device as already noted, is formed from undoped GaAs with the thickness of 4.52 nm.

The layer A5 formed on the layer A4 acts as the barrier layer and has the composition identical with the composition of the barrier layers A1 and A3. It should be noted that the layer A5 causes the tunneling of the electrons therethrough with the tunneling probability substantially identical with the tunneling probability of the holes through the barrier layer A3. For this purpose, the thickness of the layer A5 is set to 3.96 nm that is substantially larger than the thickness of the layer A3.

The layer A6 on the barrier layer A5 is used to absorb the electrons from the layer A4 similarly to the first embodiment and is formed from undoped GaAs with the thickness of 3.68 nm that is identical with the layer A2. Further, the layer A6 is doped at the central plane thereof to the n-type with silicon with the sheet concentration of $1 \times 10^{12}$ cm$^{-2}$. Summarizing the above, the composition and the thickness of the layers A1–A6 are represented in the following TABLE II.

TABLE II

| LAYER | COMPOSITION | THICKNESS (nm) |
| --- | --- | --- |
| A1 | $Al_{0.51}Ga_{0.49}As$ | 1.13 |
| A2 | GaAs | 3.68 |
| A3 | $Al_{0.51}Ga_{0.49}As$ | 1.13 |
| A4 | GaAs | 4.52 |
| A5 | $Al_{0.51}Ga_{0.49}As$ | 3.96 |
| A6 | GaAs | 3.68 |

Referring to the band diagram of FIG. 6(A), it will be noted that the energy level at the central part of the layer A2 is pushed upward due to the p-type dopants therein. It should be noted that the p-type dopants are charged negative upon activation by acquiring electrons. On the other hand, the energy level at the central part of the layer A6 is pushed downward due to the n-type dopants that are charged positive upon activation. Thereby, there is formed an electric field between the layer A2 and the layer A6 as exemplified by the gradient of the conduction band and the valence band formed in the layer A4. Thus, when the electrons are excited to the quantum level E4 in the layer A4 due to the incidence of the optical beam, the electrons are accelerated toward the layer A6 and eventually fall into the quantum level E6 of the layer A6. Similarly, the holes that are created in the quantum level H4 of the layer A4 are accelerated to the layer A2 and eventually fall to the quantum level H2 of the layer A2. Thereby, the removal of the electrons and holes from the layer A4 is substantially facilitated and the quick recovery of the device to the original state is guaranteed even when there is an incident optical beam that carries a high speed optical signal. It should be noted that the layer A2, A4 and A6 of the present embodiment are all made of GaAs. In other words, the materials forming the layers A2, A4 and A6 does not form the staggered heterojunction. In the present embodiment, the desired staggered band structure is obtained as a result of the planar doping.

Figure 6B:
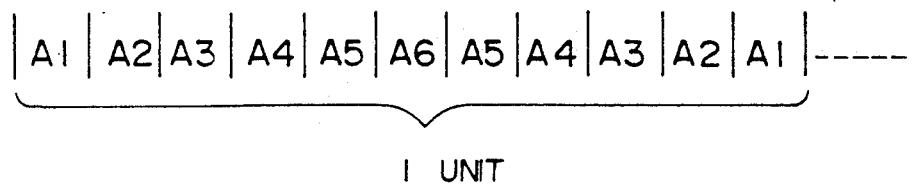

In the actual device, the layers A1–A6 are stacked as shown in FIG. 6(B), wherein the layers are arranged substantially symmetric about the central layer A6. More specifically, the layered body 11 forming the non-linear optical device (see FIG. 3) includes a layered structure A1/A2/A3/A4/A5/A6/A5/A4/A3/A2 as the unit of repetition. By stacking the layers A1–A6 as such, one can induce an alternately increasing and decreasing electric field in the vertical direction of the layered body 11, and the dissipation of the electrons and holes from the layer A4 is facilitated.

Figure 7:
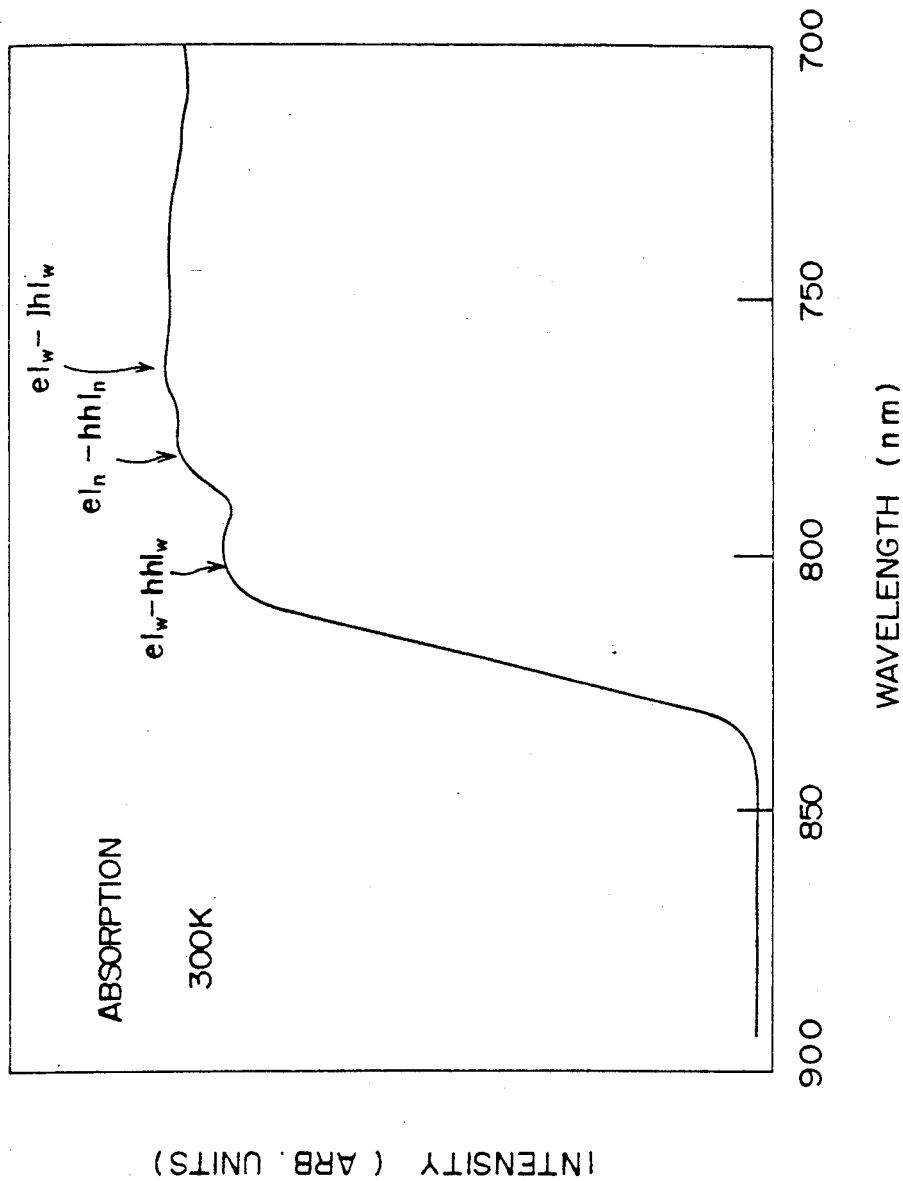
FIG. 7 is a diagram showing the absorption spectrum of the non-linear optical device according to the third embodiment.

FIG. 7 shows the static optical absorption spectrum obtained by the device of the present embodiment. In this diagram, an absorption peak designated as $el_w$-$hhl_w$ is observed at a wavelength of about 800 nm in correspondence to the excitation of the electrons in the layer A4, leaving the heavy holes in the conduction band of the layer A4. At the shorter wavelength side of the foregoing peak $el_w$-$hhl_w$, there is another absorption peak designated as $el_n$-$hhl_n$ that corresponds to the transition of electrons occurring in the layers A2 and A6, leaving the heavy holes in the quantum level H2 or H6 similar to the foregoing embodiments. Further, at the further shorter wavelength side of the absorption peak $el_n$-$hhl_n$, there is still another peak designated as $el_w$-$lh_w$ that corresponds to the transition of electrons in the layer A4, leaving the light holes in the quantum level H4 of the layer A4. The measurement was conducted at 300 K. This diagram clearly indicates the absorption of optical beam occurring in the layer A4 of the device.

The band diagram shown in FIG. 6(A) can be achieved by using other materials than those described previously. The following TABLE III shows the possible composition of the layers A1–A6 together with the thickness.

TABLE III

| LAYER | COMPOSITION | THICKNESS (nm) |
|---|---|---|
| A1 | $Al_{0.51}Ga_{0.49}As$ | 1.13 |
| A2 | $Al_{0.05}Ga_{0.95}As$ | 4.81 |
| A3 | $Al_{0.51}Ga_{0.49}As$ | 1.13 |
| A4 | GaAs | 4.52 |
| A5 | $Al_{0.51}Ga_{0.49}As$ | 3.96 |
| A6 | $Al_{0.05}Ga_{0.95}As$ | 4.81 |

Again, the layer A2 has a doping plane formed at the central level thereof by the p-type dopant such as Be. Typically, Be is doped with the sheet concentration level of $5.5 \times 10^{11}$ cm$^{-2}$. Similarly, the layer A6 has a doping plane at the central level thereof by the n-type dopant such as Si. Typical, Si is doped with the sheet concentration level also of about $5.5 \times 10^{11}$ cm$^{-2}$. The planar doping of the layer A2 and A6 may be achieved during the MBE or MOCVD growth of these layers. Again, the technique of planar doping for these materials is well established and further description about the fabricating process will be omitted.

Figure 8:
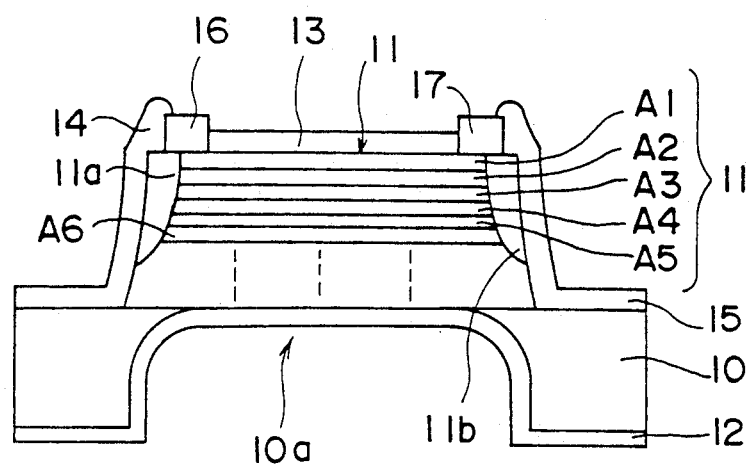
FIG. 8 is a diagram showing the structure of the non-linear optical device according to a fourth embodiment of the present invention.

FIG. 8 shows the structure of the non-linear optical device according to a fourth embodiment of the present invention, wherein the electrodes 14 and 15 described previously with reference to the second embodiment are provided. Thereby, the p-type diffusion region 11a and the n-type diffusion region 11b are formed similarly, and the carriers accumulated in the layers A2 and A6 are removed by applying a reverse bias voltage across the electrodes 14 and 15. As the principle of the device of the present embodiment is obvious from the foregoing descriptions, further explanation will be omitted.

Figure 9:
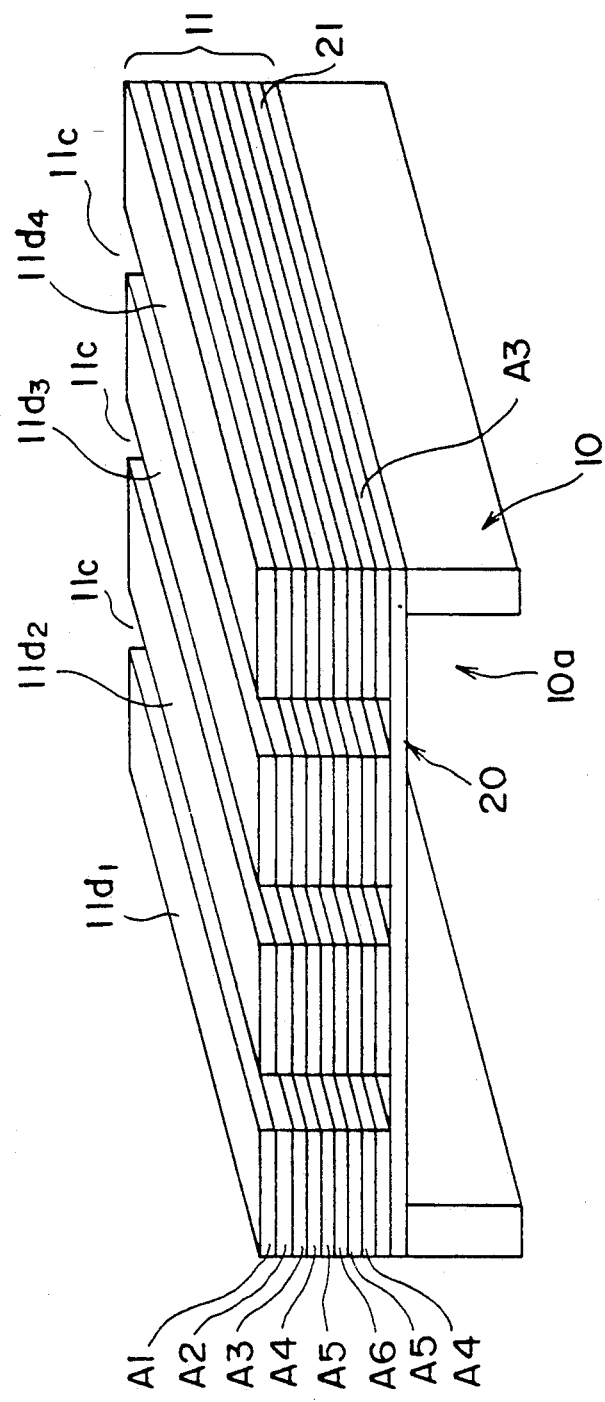
FIG. 9 is a perspective view showing the structure of the non-linear optical device according to a fifth embodiment of the present invention.

FIG. 9 is a diagram showing a fifth embodiment of the present invention.

Referring to FIG. 9, the device is constructed on the substrate 10 that is now formed of GaAs, and a layer 21 of AlAs is grown on the upper major surface of the substrate 10 typically with a thickness of about 20 nm. Further, the penetrating opening 10a is formed on the substrate 10 to extend from the lower major surface to the upper major surface thereof, such that the lower major surface of the layer 21 is exposed. As will be explained below, this AlAs layer 21 acts as an etching stopper.

On the upper major surface of the layer 21, the layered body 11 is grown. As mentioned with reference to the first embodiment, the layered body 11 includes the layers A1–A6, wherein these layers have the composition and thickness as summarized in TABLE IV below.

TABLE IV

| LAYER | COMPOSITION | THICKNESS (nm) |
|---|---|---|
| A1 | $Al_{0.51}Ga_{0.49}As$ | 1.13 |
| A2 | GaAs | 3.68 |
| A3 | $Al_{0.51}Ga_{0.49}As$ | 1.13 |
| A4 | GaAs | 4.52 |
| A5 | $Al_{0.51}Ga_{0.49}As$ | 3.96 |
| A6 | GaAs | 3.68 |

Further, the layers A2 and A6 are subjected to the planar doping wherein the layer A2 is formed with a p-type doping plane and the layer A6 is formed with an n-type doping plane similar to other embodiments. Thereby, there is a band structure that is similar to the band structure shown in FIG. 6(A).

On the layer 21, the layers A1–A6 are repeated for 25 times with the unit of repetition as set forth in the third embodiment. Thereby, the layered body 11 is formed.

The layered body 11 thus formed is then subjected to an etching process to form a number of grooves 11c. It should be noted that each groove 11c extends from the upper major surface to the lower major surface of the layered body 11, and the layered body 11 is thereby divided into a number of blocks $11d_1$, $11d_2$, $11d_3$ and $11d_4$ each surrounded by a side wall.

It should be noted that the side walls thus formed include a number of surface states that act as the trap of carriers. In other words, once the electrons and holes are transported to the side wall of the blocks $11d_1$–$11d_4$, they are trapped by the surface states therein and annihilated by causing the recombination. Thus, the present embodiment can eliminate the problem of the electrons and holes being accumulated in the layers A2 and A6 and prevents the retardation of recovery of the original optical state even when the incident optical beam carries high speed optical pulses.

The structure of FIG. 9 is formed according to the following process.

At first, the upper major surface of the layered body 11 is covered by a silicon oxide film (not shown) that may be deposited by a CVD process.

Next, a photoresist (not shown) is applied on the upper major surface of the silicon oxide film thus formed and patterned in accordance with the pattern of the grooves 11c to be formed. After the patterning of the photoresist, the silicon oxide film is patterned by an RIE process that is achieved by an etching gas of $CHF_3$.

Next, the layered body 11 is etched while using the patterned silicon oxide film as a mask, by an etching gas of chloride. Thereby, the etching proceeds toward the substrate 10 and stops upon the exposure of the layer 21. As a result of the etching, the grooves 11c are formed together with the blocks $11d_1-11d_4$ that are separated by the grooves.

After the blocks are formed as such, the layered body 11 is protected by a mask and the lower major surface of the substrate 10 is subjected to a wet etching process that may be achieved by an etchant of $NH_3$ solution. Again, the layer 21 acts as the etching stopper and the etching stops when the lower major surface of the layer 21 is exposed.

Figure 10:
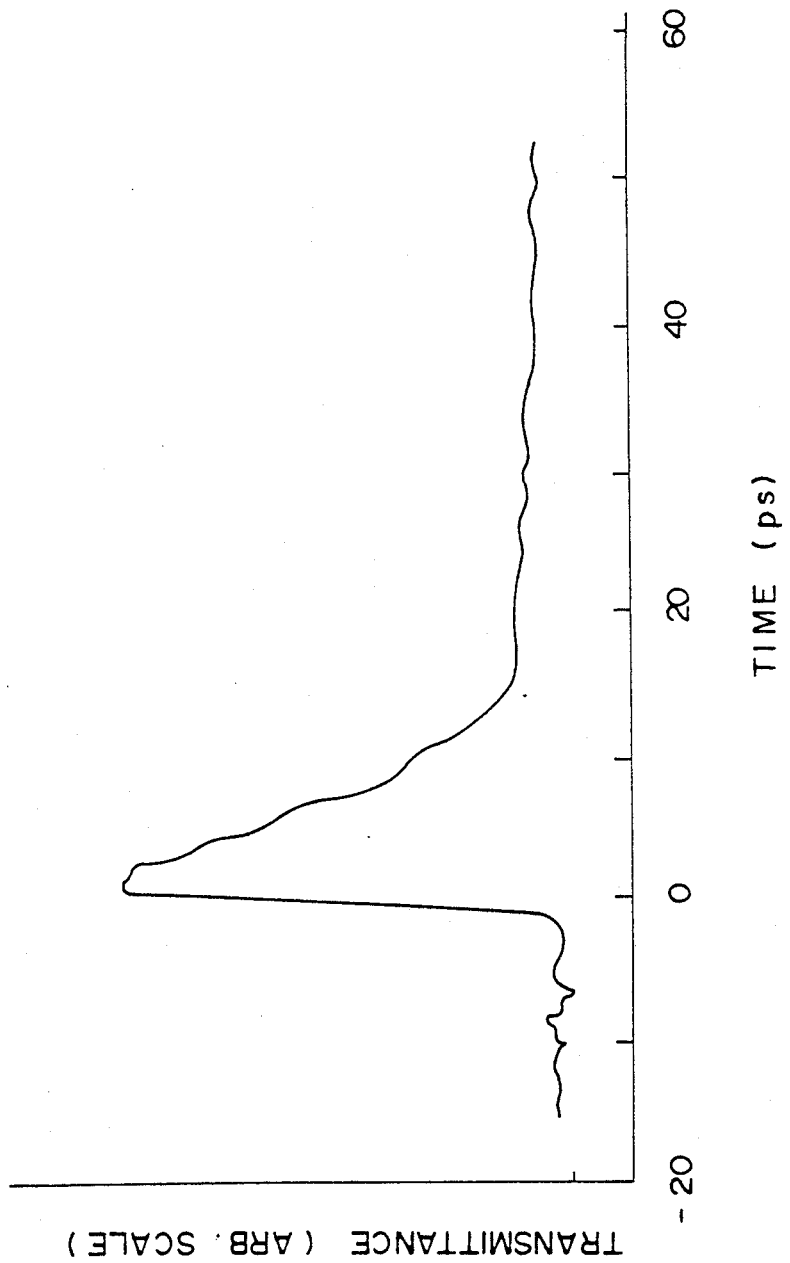
FIG. 10 is a diagram showing the response of the optical absorption achieved by the device of the fifth embodiment of the present invention.

FIG. 10 shows the response of the device of FIG. 9. In this experiment, an optical beam carrying the optical pulse with the repetition rate of 82 MHz was irradiated. The device tested had a layered body 11 with a size of 100 μm×100 μm in the plan view, and there were 25 grooves 11c formed each with a width of 0.5 μm. As shown in FIG. 10, it was confirmed that the original optical state is resumed in the matter of 10-20 picoseconds. Further, it was found that a similar quick recovery is achieved even when the repetition rate is increased to about 10 GHz.

In the present embodiment, one may provide mirrors similar to the mirrors 12 and 13 at the upper and lower major surfaces of each block $11d_1-11d_4$. As already noted with reference to the first embodiment, the device may be adjusted such that the transmission of the incident optical beam occurs by establishing a standing wave between the mirrors when there is no incident optical beam. In this case, the device loses transparency upon incidence of the control beam. See FIG. 3. Alternatively, one may set the device such that there is no standing wave between the opposing mirrors and that the standing wave is established upon the incidence of the control beam.

Figure 11:
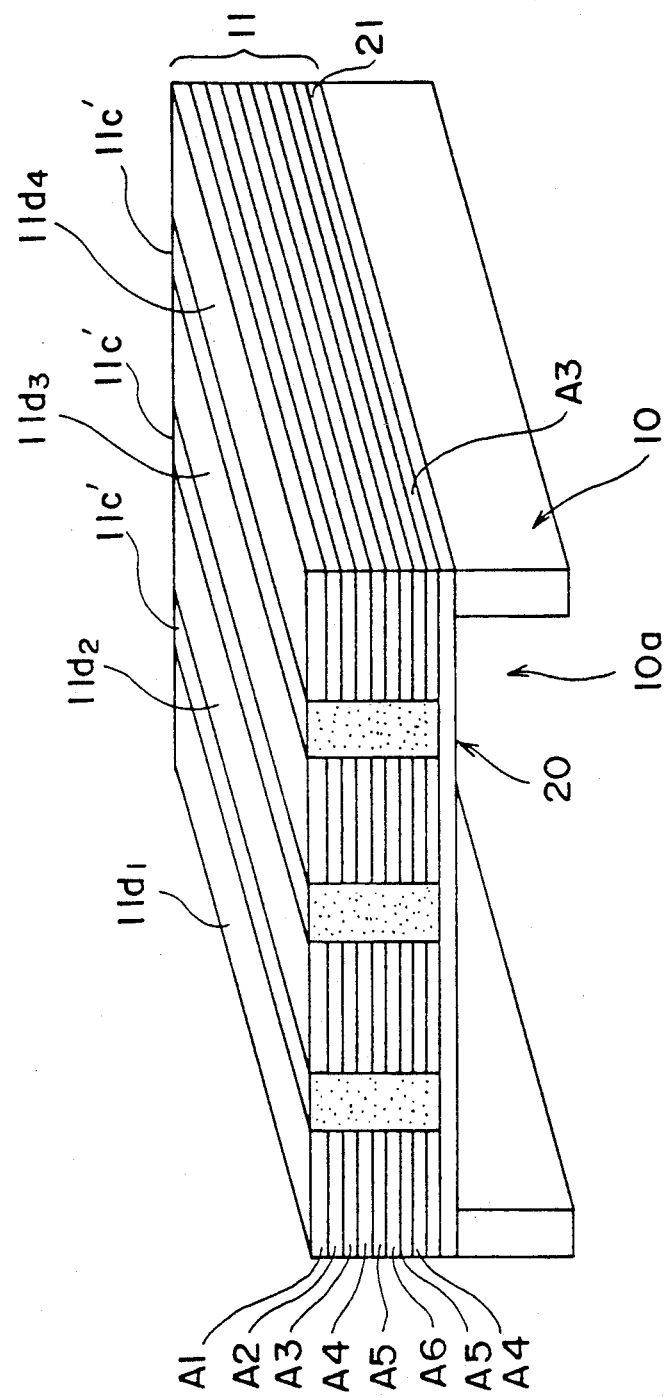
FIG. 11 is a diagram showing a modification of the device of FIG. 9.

As a modification of the device of FIG. 9, one may form the defective regions 11c' in place of the grooves 11c as shown in FIG. 11. More specifically, an ion implantation of oxygen may be made to the layered body 11 in correspondence to where the grooves 11c are formed in the embodiment of FIG. 9. Thereby, the defects induced as a result of the ion implantation act as the trap of carriers and the electrons and holes accumulated in the layers A2 and A4 are annihilated by causing the recombination.

Further, the present invention is not limited to the embodiments described heretofore, but various variations and modifications may be made without departing from the scope of the invention.

What is claimed is:

1. A non-linear optical device for causing a transition of an optical state from an initial state to an activated state in response to an optical beam, comprising:
   a first quantum well layer having upper and lower major surfaces, said first quantum well layer having a first quantum level for electrons and a second quantum level for holes, said first quantum level and said second quantum level being separated from each other by a first energy gap;
   first barrier means having upper and lower major surfaces and having a first band gap that is substantially larger than said first energy gap, said first barrier layer being provided on said upper major surface of said first quantum well layer for dissipating electrons away from the first quantum well layer by tunneling, said first barrier means having a first thickness that allows the tunneling of electrons therethrough;
   second barrier means having upper and lower major surfaces and having a second band gap that is substantially larger than said first energy gap, said second barrier layer being provided on said lower major surface of said first quantum well layer for dissipating holes away from the first quantum well layer by tunneling, said second barrier means having a second thickness that allows the tunneling of holes therethrough;
   a second quantum well layer having upper and lower major surfaces, said second quantum well layer having a third quantum level for electrons and a fourth quantum level for holes, said third quantum level and said fourth quantum level being separated from each other by a second energy gap, said second quantum well layer being provided on said upper major surface of said first barrier means and establishing said third quantum level at a level energetically lower than said first quantum level in terms of the energy of the electrons and said fourth quantum level at a level energetically higher than said second quantum level in terms of the energy of the holes;
   a third quantum well layer having upper and lower major surfaces, said third quantum well layer having a fifth quantum level for electrons and a sixth quantum level for holes, said fifth quantum level and said sixth quantum level being separated from each other by a third energy gap, said third quantum well layer being provided on said lower major surface of said second barrier means and establishing said fifth quantum level at a level energetically higher than said first quantum level in terms of the energy of the electrons and sixth quantum level at a level energetically lower than said second quantum level in terms of the energy of the holes.

2. A non-linear optical device as claimed in claim 1 in which said second and third energy gaps are set to be substantially larger than said first energy gap.

3. A non-linear optical device as claimed in claim 1 in which said first, second and third quantum well layers are formed from first, second and third materials respectively, wherein said first and second materials and said second and third materials form a staggered heterojunction interface.

4. A non-linear optical device as claimed in claim 1 in which said second quantum well layer includes therein a doping plane doped to the n-type such that the third quantum level of the second quantum well layer is located energetically lower than the first quantum level of the first quantum well layer in terms of the energy of the electrons and that the fourth quantum level of the second quantum well layer is located energetically higher than the second quantum level of the first quantum well layer in terms of the energy of the holes, said third quantum well layer includes therein a doping plane doped to the p-type such that the fifth quantum level of the third quantum well layer is located energetically higher than the first quantum level of the first quantum well layer in terms of the energy of the electrons and that the sixth quantum level of the third quantum well layer is located energetically lower than the second quantum level of the first quantum well layer in terms of the energy of the holes.

5. A non-linear optical device as claimed in claim 4 in which said first through third quantum well layers are formed from a same material.

6. A non-linear optical device as claimed in claim 1 in which said first and second barrier means have first and second thicknesses respectively, wherein said first and second thicknesses are determined such that said first barrier means has a tunneling probability of electrons that is substantially identical with a tunneling probability of holes through the second barrier means.

7. A non-linear optical device as claimed in claim 6 in which said first thickness of the first barrier means is set substantially larger than said second thickness of the second barrier means.

8. A non-linear optical device as claimed in claim 1 in which said device further comprises carrier removing means for removing the electrons from the second quantum well layer and for removing the holes from the third quantum well layer.

9. A non-linear optical device as claimed in claim 8 in which said carrier removing means comprises an n-type region in contact with said second quantum well layer for applying a positive bias voltage to said second quantum well layer, and a p-type region in contact with said third quantum well layer with a separation from said n-type region for applying a negative bias voltage to the third quantum well layer.

10. A non-linear optical device as claimed in claim 8 in which said carrier removing means comprises a groove formed to extend at least from said upper major surface of said second quantum well layer to said lower major surface of said third quantum well layer, said groove being defined by a side wall.

11. A non-linear optical device as claimed in claim 8 in which said carrier removing means comprises a region formed to extend at least from said upper major surface of said second quantum well layer to said lower major surface of said third quantum well layer, said region containing defects that act as a center of recombination.

12. A non-linear optical device as claimed in claim 1 in which said device comprises a third barrier means having upper and lower major surfaces and a third band gap substantially larger than any of said first and second energy gaps, said third barrier means being provided on the lower major surface of said third quantum well layer, said first through third quantum well layers and said first through third barrier means being repeated for a plurality of times to form a superlattice structure.

13. A non-liner optical device as claimed in claim 12 in which said second quantum well layer includes therein a doping plane doped to the n-type such that the third quantum level of the second quantum well layer is located energetically lower than the first quantum level of the first quantum well layer in terms of the energy of the electrons and that the fourth quantum level of the second quantum well layer is located energetically higher than the second quantum level of the first quantum well layer in terms of the energy of the holes, said third quantum well layer includes therein a doping plane doped to the p-type such that the fifth quantum level of the third quantum well layer is located energetically higher than the first quantum level of the first quantum well layer in terms of the energy of the electrons and that the sixth quantum level of the third quantum well layer is located energetically lower than the second quantum level of the first quantum well layer in terms of the energy of the holes, said superlattice structure having a structure essentially consisted of said third barrier means, said third quantum well layer provided on the upper major surface of the third barrier means, said second barrier means provided on the upper major surface of the third quantum well layer, said first quantum well layer provided on the upper major surface of the second barrier means, said first barrier means provided on the upper major surface of the first quantum well layer, said second quantum well layer provided on the upper major surface of the first barrier means, said first barrier means provided on the upper major surface of said second quantum well layer, said first quantum well layer provided on the upper major surface of said first barrier means, said second barrier means provided on the upper major surface of said first quantum well layer, and said third quantum well layer provided on the upper major surface of the second barrier means, as a unit of repetition.

14. A non-linear optical device as claimed in claim 1 in which said third quantum level is located lower than said first quantum level, in terms of energy of the electrons, by an energy difference corresponding to an energy of LO-mode phonons that exists in the second quantum well layer, and said sixth quantum level is located lower than said second quantum level, in terms of energy of the holes, by an energy difference corresponding to an energy of LO-mode phonons that exists in the third quantum well layer.

* * * * *